United States Patent
Kubokura

(10) Patent No.: US 8,902,452 B2
(45) Date of Patent: Dec. 2, 2014

(54) IMAGE FORMING APPARATUS THAT ACQUIRES AND DISPLAYS LIST INFORMATION FROM DOCUMENT MANAGEMENT APPARATUS FOR SELECTION OF PROCESS TARGET FOR IMAGE FORMATION

(75) Inventor: Masatoshi Kubokura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 991 days.

(21) Appl. No.: 12/404,370

(22) Filed: Mar. 16, 2009

(65) Prior Publication Data
US 2009/0237722 A1    Sep. 24, 2009

(30) Foreign Application Priority Data

Mar. 18, 2008    (JP) ............................... 2008-068626
Nov. 27, 2008    (JP) ............................... 2008-302902

(51) Int. Cl.
G06F 3/12        (2006.01)
H04N 1/00        (2006.01)
H04N 1/32        (2006.01)

(52) U.S. Cl.
CPC .......... *G06F 3/1285* (2013.01); *H04N 1/00413* (2013.01); *H04N 2201/3278* (2013.01); *H04N 2201/0039* (2013.01); *G06F 3/1204* (2013.01); *H04N 2201/0082* (2013.01); *H04N 1/32106* (2013.01); *H04N 2201/3273* (2013.01); *H04N 1/00244* (2013.01); *H04N 2201/0087* (2013.01); *H04N 1/00233* (2013.01); *H04N 1/00464* (2013.01); *H04N 1/00222* (2013.01); *H04N 2201/3226* (2013.01); *G06F 3/1254* (2013.01)

USPC .......................................... 358/1.15; 709/206

(58) Field of Classification Search
USPC .................. 358/1.1, 1.15, 1.9, 1.13
See application file for complete search history.

(56) References Cited

U.S. PATENT DOCUMENTS

| | | | |
|---|---|---|---|
| 7,016,057 B1 | 3/2006 | Maruyama | |
| 2004/0205163 A1* | 10/2004 | Yagi | 709/219 |
| 2006/0044607 A1* | 3/2006 | Kato | 358/1.15 |
| 2006/0262349 A1* | 11/2006 | Moroi | 358/1.15 |
| 2007/0201086 A1* | 8/2007 | Kim et al. | 358/1.15 |
| 2010/0309502 A1* | 12/2010 | Ando et al. | 358/1.13 |

FOREIGN PATENT DOCUMENTS

| | | |
|---|---|---|
| EP | 1852748 A1 * | 11/2007 |
| JP | 2002-049436 | 2/2002 |
| JP | 2002-259071 | 9/2002 |
| JP | 2004-272779 | 9/2004 |
| JP | 2006-352845 | 12/2006 |
| JP | 2007-116268 | 5/2007 |
| JP | 2007-128544 | 5/2007 |

OTHER PUBLICATIONS

Japanese Office Action dated Oct. 30, 2012.

* cited by examiner

*Primary Examiner* — Scott A Rogers
*Assistant Examiner* — Richa Mishra
(74) *Attorney, Agent, or Firm* — IPUSA, PLLC

(57) ABSTRACT

An image forming system includes an image forming apparatus managing a display device and configured to function as a Web client, and a document management apparatus managing document information usable for a process target of the image forming apparatus and list information of the document information and configured to function as a Web server. The document management apparatus is coupled to the image forming apparatus via a communication network.

20 Claims, 7 Drawing Sheets

IMAGE FORMING APPARATUS THAT ACQUIRES AND DISPLAYS LIST INFORMATION FROM DOCUMENT MANAGEMENT APPARATUS FOR SELECTION OF PROCESS TARGET FOR IMAGE FORMATION

BACKGROUND OF THE INVENTION

1. Field of the Invention

The present invention relates to an image forming apparatus configured to function as a Web client which processes a document included in a document management apparatus configured to function as a Web server. The present invention also relates to an image forming system constituted by such an image forming apparatus and a document management apparatus, a system control method for the image forming system, and a computer-readable recording medium storing instructions executable by a computer to execute the system control method of the image forming system.

2. Description of the Related Art

Recently, broadband (high speed data communication) networks such as high speed Internet have been improved. Network connections of multifunction peripherals (MFPs) which may function as any one or an arbitrary combination of a scanner, a printer, and a facsimile machine are widely used.

Further, it is possible for a computer terminal to manage a print process and a facsimile transmission by the network connection of the MFP, and there is user demand for MFPs which can be compatible with different environments such as in an office or in a public space.

For example, a Japanese Patent Application Publication No. 2006-352845 proposes an image forming apparatus connected to a network which generates image data for displaying Hypertext Markup Language (HTML) data on a display of the image forming apparatus.

However, in a related art, there was a problem in that operation of the computer terminal becomes complicated when printing is performed by the MFP connected to the network after receiving print instructions from the computer terminal. This may further increase the burden on the user.

SUMMARY OF THE INVENTION

It is a general object of the present invention to provide a novel and useful MFP coupled to the network having improved customization and convenience by taking into account a user's preference, office environment or the like, in which the problem described above is minimized.

One aspect of the present invention is to provide an image forming system including an image forming apparatus including a display device and configured to function as a Web client; and a document management apparatus managing document information usable for a process target of the image forming apparatus and list information of the document information and configured to function as a Web server, the document management apparatus being coupled to the image forming apparatus via a communication network; the image forming apparatus comprising: a list acquisition part configured to acquire the list information from the document management apparatus; a process target reception part configured to display the list information acquired by the list acquisition part on the display device, and to receive a selection of the process target from the list information displayed on the display device; a process target acquisition part configured to acquire the document information corresponding to the selection of the process target received by the process target reception part from the document management apparatus; and an image formation part configured to perform a predetermined image forming process for the document information acquired by the process target acquisition part.

According to one aspect of the present invention, there is provided a system control method of an image forming system, wherein the image system includes: an image forming apparatus including a display device and configured to function as a Web client; and a document management apparatus managing document information usable for a process target of the image forming apparatus and list information of the document information and configured to function as a Web server, the image forming apparatus and the document management apparatus being coupled via a communication network; the system control method comprising the steps of: acquiring, by the image forming apparatus, the list information from the document management apparatus; displaying, by the image forming apparatus, the image forming apparatus, the list information acquired by the acquiring and receiving a selection of the process target selected from the list information displayed on the display device; acquiring, by the image forming apparatus, the document information corresponding to the selection of the process target from the document management apparatus; and performing, by the image forming apparatus, a predetermined image forming process for the document information acquired by the acquiring the document information corresponding to the selection of the process target.

According to another aspect of the present invention, there is provided an image forming apparatus including a display device and configured to function as a Web client, the image forming apparatus comprising: a document management apparatus managing document information usable for a process target of the image forming apparatus and list information of the document information and configured to function as a Web server, the document management apparatus being coupled to the image forming apparatus via a communication network; a list acquisition part configured to acquire the list information from the document management apparatus; a process target reception part configured to display the list information acquired by the list acquisition part on the display device, and to receive a selection of the process target from the list information displayed on the display device; a process target acquisition part configured to acquire the document information corresponding to the selection of the process target received by the process target reception part from the document management apparatus; and an image formation part configured to perform a predetermined image forming process for the document information acquired by the process target acquisition part.

Other objects, features and advantages of the present invention will become more apparent from the following detailed description when read in conjunction with the accompanying drawings.

DETAILED DESCRIPTION OF THE PREFERRED EMBODIMENTS

In the following, the preferred embodiments for achieving the present invention will be described with accompanying drawings.

(Operation of Image Forming System of the Present Embodiment)

FIGS. 1 through 4 are used for describing operations of an image forming system 100 of an embodiment of the present embodiment.

Figure 1:
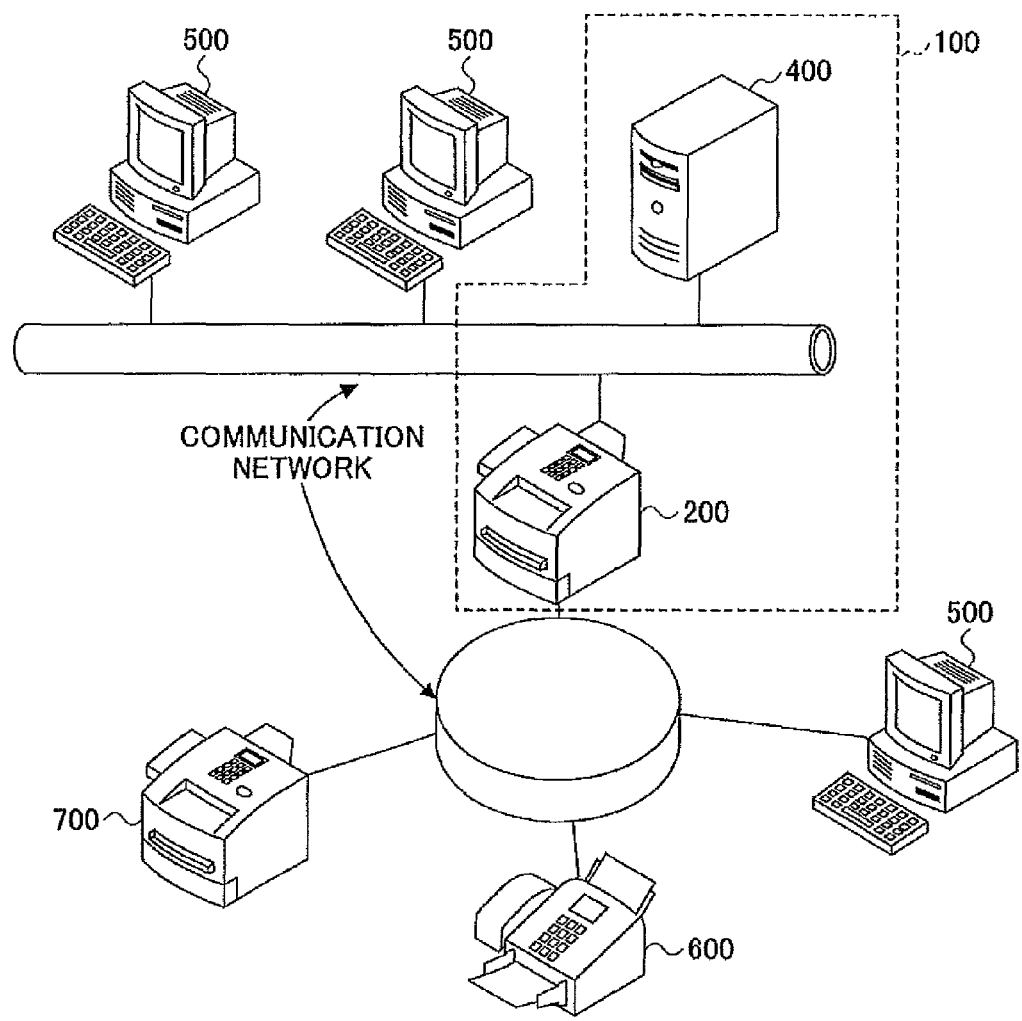
FIG. 1 is a block diagram for describing an overall system configuration of the image forming system.

FIG. 1 is a block diagram for describing an overall system configuration of the image forming system 100. As shown FIG. 1, the image forming system 100 includes an image forming apparatus 200 and a document management apparatus 400, in which the image forming apparatus 200 and the document management apparatus 400 are connected via a communication network. Also, the document management apparatus 400 has a function of a Web server and the image forming apparatus 200 has a function of a Web client. HTML formatted data are transmitted and received between the document management apparatus 400 and the image forming apparatus 200.

The document management apparatus 400 and the image forming apparatus 200 may be formed by a general-purpose computer.

Further, the communication network connecting between the image forming apparatus 200 and the document management apparatus 400 is connected to a personal computer (PC) terminal 500. A user generates document information 430 (or electronic file, or document data), and the document information 430 is accumulated (stored) to the document management apparatus 400 via the communication network.

The document management apparatus 400 includes list information 440 of the document information 430. The list information 440 is written in the HTML format. The document management apparatus 400 transmits the list information 440 to the image forming apparatus 200. The image forming apparatus 200 receives the list information 440 and displays the list information 440 on a display device 300 of the image forming apparatus 200 using a Web browser.

When the user selects the document information 430 as a target to be processed by the image forming apparatus 200 from the list information 440 displayed on the display device 300, the image forming apparatus 200 transmits a selection of the process target corresponding to the selected document information 430 to the document management apparatus 400. In response to this, the document management apparatus 400 writes the target document information 430 in a page description language (PDL) format and transmits the document information 430 written in the PDL format to the image forming apparatus 200. Here, the document management apparatus 400 may convert the target document information 430 into bitmap image data and transmits the bitmap image data to the image forming apparatus 200 instead of writing the target document information 430 in the PDL format. Also, the document management apparatus 400 may transmit the original document information 430 to the image forming apparatus 200 without writing the document information 430 in the PDL format.

When the image forming apparatus 200 receives PDL data, bitmap image data or the document information 430, the image forming apparatus 200 performs a print process, facsimile transmission for the received data or transmits an email attaching the received data to an apparatus externally connected to the communication network. The apparatus externally connected may be, for example, the PC terminal 500, a facsimile machine 600 or another MFP 700 as shown in FIG. 1.

With this, the image forming system 100 can achieve a print process, a facsimile process, and an email transmission between the document management apparatus 400 and image forming apparatus 200 independent of the PC terminal 500.

Figure 2:
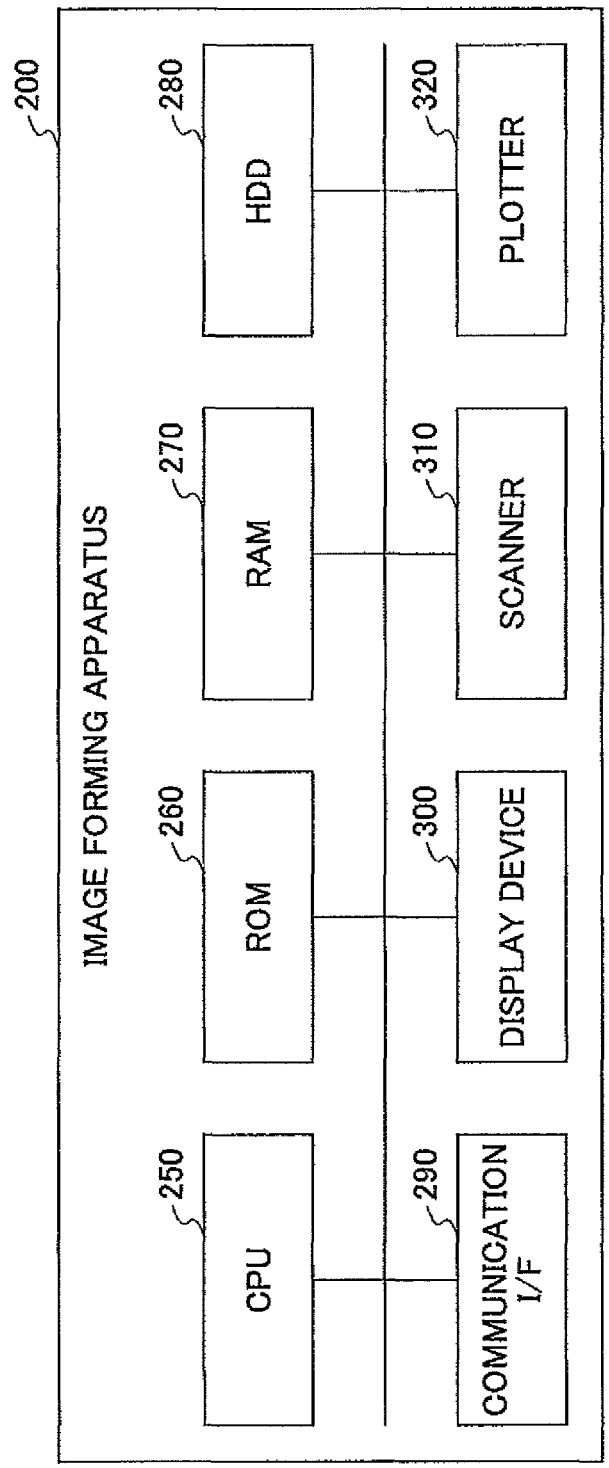
FIG. 2 is a block diagram showing an example of a hardware configuration of the image forming apparatus.

FIG. 2 is a block diagram showing an example of a hardware configuration of the image forming apparatus 200. As shown in FIG. 2, the image forming apparatus 200 includes a Central Processing Unit (CPU) 250, a Read-Only Memory (ROM) 260, a Random Access Memory (RAM) 270, a Hard Disk Drive (HDD) 280, a communication interface (communication I/F) 290, a display device 300, a scanner 310, and a plotter 320. The CPU 250, the ROM 260, the RAM 270, the HDD 280, the communication I/F 290, the display device 300, the scanner 310, and the plotter 320 may be provided with a housing (not shown) of the image forming apparatus 200.

The CPU 250 is a device which executes a program stored in the ROM 260 and performs arithmetic operations for data loaded in the RAM 270 according to the program, and then controls the entire image forming apparatus 200. The ROM 260 stores the program or data to be executed by the CPU 250. When the CPU 250 executes the program stored in the ROM 260, the RAM 270 is loaded with the program and data to be executed, and temporarily stores program and data operating data while the arithmetic operations are performed. The HDD 280 is a storage device which stores programs and data such as basic software, the Operating System (OS) and an application program related to the present embodiment with related data.

The communication I/F 290 is an interface which transmits and receives information (data) with peripheral devices (e.g. the document management apparatus 400, the PC terminal 500, the facsimile machine 600, the MFP 700 or the like) having other communication functions being connected via a wireless (radio) communication network or a cable communication network. The image forming apparatus 200 of the present embodiment is connected to a local area network (LAN) via the communication I/F 290 and performs transmission/reception of a variety of data with the document management apparatus 400 connected to the LAN based on a communication protocol such as the Transmission Control Protocol/Internet Protocol (TCP/IP).

The display device 300 includes key switches, a liquid crystal display (LCD) or the like and functions as a user interface when the user utilizes a function of the image forming apparatus 200 or establishes a variety of settings. Also, the scanner 310 reads a document and acquires image data of the document. The plotter 320 outputs the image data on a printing medium.

Each of functions of the image forming apparatus 200 may be achieved by which the CPU 250 executes a program stored in the ROM 260 or the HDD 280 corresponding to each of the functions, or may be achieved by performing a process using hardware corresponding to each of the functions.

Figure 3:
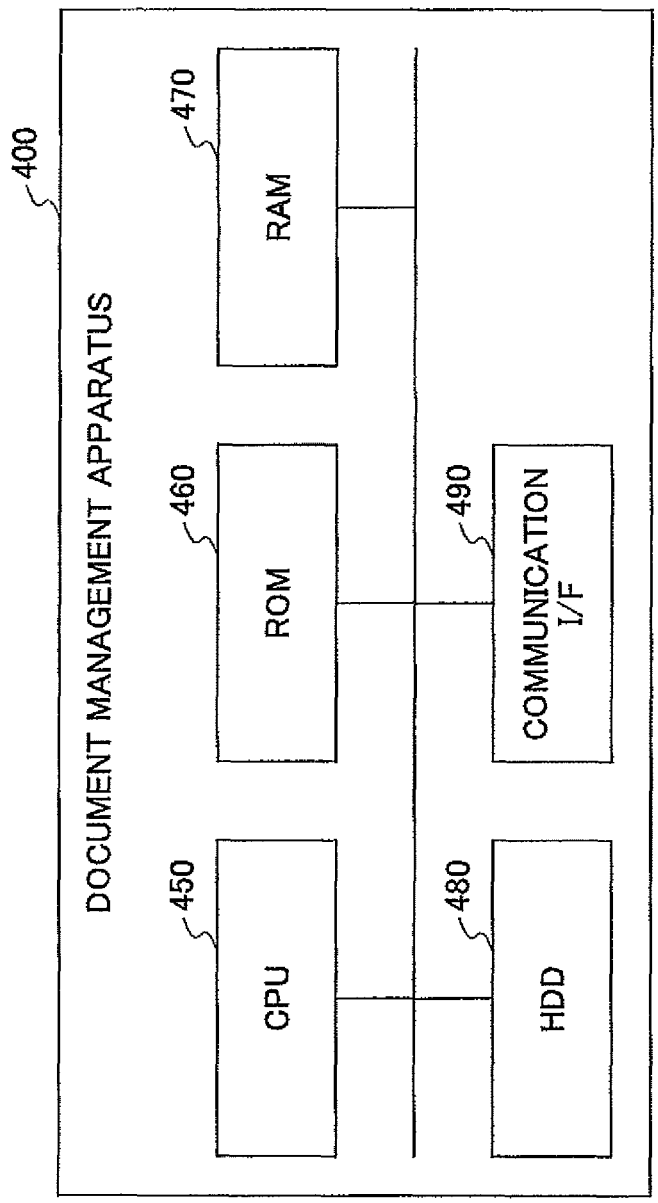
FIG. 3 is a block diagram showing an example of a hardware configuration of the document management apparatus according to the present embodiment.

FIG. 3 is a block diagram showing an example of a hardware configuration of the document management apparatus according to the present embodiment. As shown in FIG. 3, the document management apparatus 400 includes a CPU 450, a ROM 460, an HDD 480, and a communication I/F 490.

The CPU 450 is a device which executes a program stored in the ROM 460 and performs arithmetic operations for data loaded in the RAM 470 according to the program, and then controls the entire image forming apparatus 400. The ROM 460 stores the program or data to be executed by the CPU 450. When the CPU 450 executes the program stored in the ROM 460, the RAM 470 is loaded with the program and data to be executed, and temporarily stores operating data while the arithmetic operations are performed. The HDD 480 is a storage device which stores programs and data such as basic software, the Operating System (OS) and an application program related to the present embodiment with related data. In the present embodiment, the document information 430 and the list information 440 are stored and held in the HDD 480.

The communication I/F 490 is an interface which transmits and receives information (data) with peripheral devices (e.g. the image forming apparatus 200, the PC terminal 500 or the like) having other communication functions being connected via a wireless (radio) communication network or a cable communication network. The document management apparatus 400 of the present embodiment is connected to a LAN via the communication I/F 490 and performs transmission/reception of a variety of data with the image forming apparatus 200 and the PC terminal 500 connected to the LAN based on a communication protocol such as TCP/IP.

Each of functions of the image forming apparatus 400 may be achieved by which the CPU 450 executes a program stored in the ROM 460 or the HDD 480 corresponding to each of the functions, or may be achieved by performing a process with respect to each of the functions using hardware corresponding to each of the functions.

Figure 4:
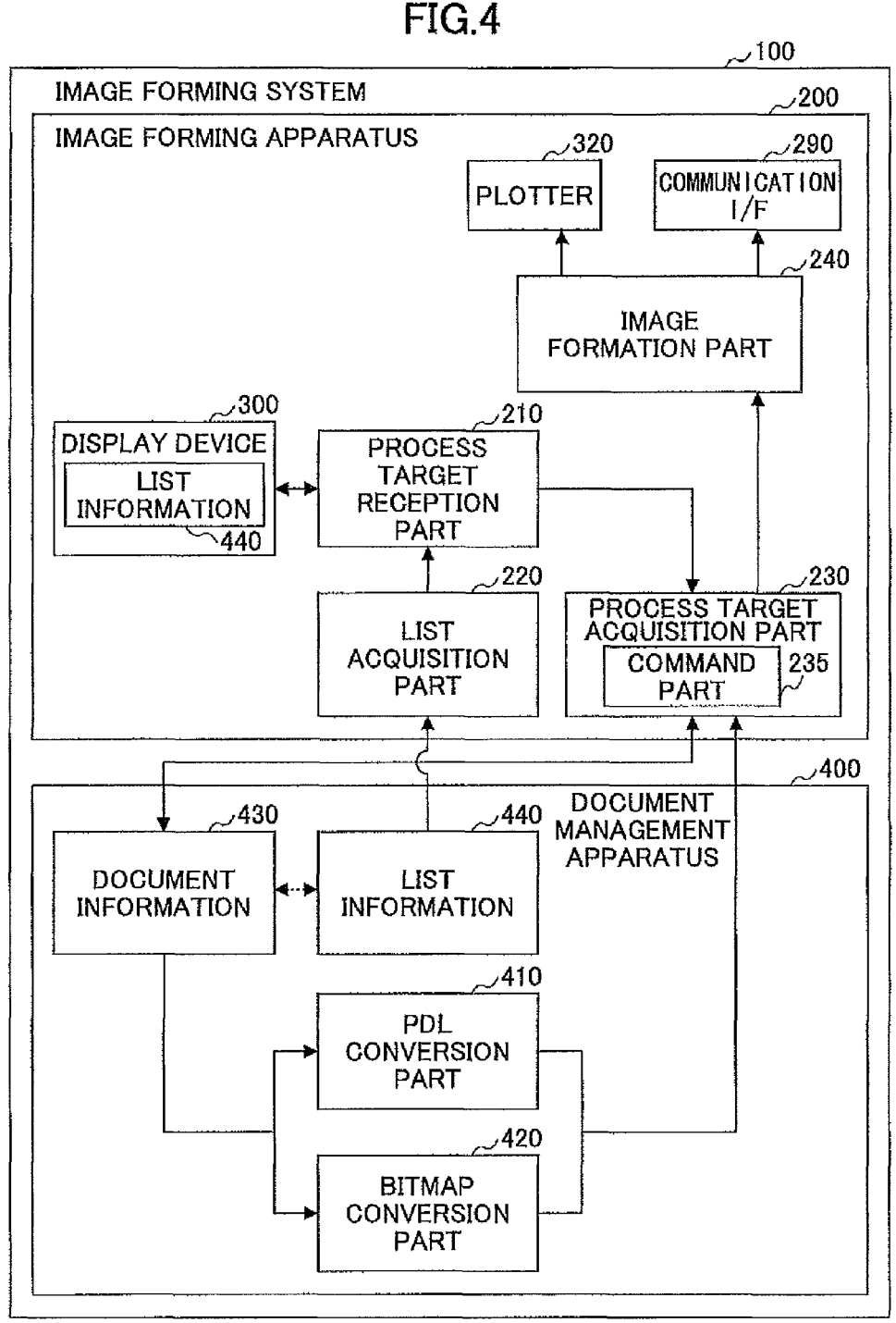
FIG. 4 is a block diagram showing operations of the image forming system.

FIG. 4 is a block diagram showing operations of the image forming system 100. As shown in FIG. 4, the image forming system 100 includes the image forming apparatus 200 and the document management apparatus 400.

As shown in FIG. 4, the image forming apparatus 200 includes a process target reception part 210, a list acquisition part 220, a process target acquisition part 230, and an image formation part 240. The list acquisition part 220 acquires the list information 440 transmitted from the document management apparatus 400. The list information 440 may be formed in the HTML format.

The process target reception part 210 displays the list information 440 acquired from the list acquisition part 220 on the display device 300. Further, the process target reception part 210 allows the user to select the document information 430 as a process target from the list information 440 displayed on the display device 300. The process target reception part 210 receives the document information of the process target selected by the user (referred to as the document information corresponding to selection of the process target). In this case, the process target to be selected may be the document information 430 for a single document or the document information 430 for plural documents.

The process target acquisition part 230 transmits a notice to the document management apparatus 400 about information (e.g. identifying information of the document information 430) of a selection of the process target received by the process target reception part 210 and identifying the document information 430 selected by the user. Further, the process target acquisition part 230 acquires (receives) the document information 430 which is transmitted by the document management apparatus 400 in response to the notice from the process target acquisition part 230. In this case, the document information 430 acquired by the process target acquisition part 230 may be the document information 430 written in the PDL format converted by a page description language (PDL) conversion part 410 (or a conversion part 410) as described below, or bitmap image data converted (expanded) from the document information 430 by a bitmap conversion part 420 as described below. Also, the process target acquisition part 230 may acquire an electronic document such as a PDF file as an original format without conversion.

Further, the process target acquisition part 230 may include a command part 235. The command part 235 transmits a transmission request for the document information 430 corresponding to the selection of the process target received by the process target reception part 210 to the document management apparatus 400 with an IP address or the like of the image forming apparatus 200 as a destination of the document information 430.

The image formation part 240 performs an image forming process such as a print process, a facsimile process, and an email transmission process for data acquired by the process target acquisition part 230. In this case, the print process is to form bitmap image data based on the acquired PDL data and outputs the formed bitmap image data on a print medium by the plotter 320. Also, in the print process, if the acquired data are in a PDF format, then the bitmap image data may be formed based on the PDF format, or if the acquired data are bitmap image data, then the bitmap image data may be output on the print medium by the plotter 320.

Further, the facsimile process is to form bitmap image data based on the acquired PDL data and transmits the formed bitmap image data to a destination via the communication I/F 290. In the facsimile process, if the data are in a PDF format, then the bitmap image data may be formed based on the PDF data, or if the acquired data are bitmap image data, then the bitmap image data may be transmitted to the destination via the communication I/F 290. The email process is to attach the acquired data to an email as an attachment file and transmit the email.

For an example of the process target reception part 210, the process target reception part 210 may receive the selection of the process target and the destination information of the process target data if the image forming process performed by the image formation part 240 is the facsimile process or the email transmission process.

As shown in FIG. 4, the document management apparatus 400 includes the PDL conversion part 410 and the bitmap conversion part 420. The PDL conversion part 410 writes the document information 430 corresponding to the notice by the process target acquisition part 230 in the PDL format and transmits the document information 430 written in the PDL format to the image forming apparatus 200.

The bitmap conversion part 420 converts the document information 430 corresponding to the notice by the process target acquisition part 230 to bitmap image data and transmits the converted bitmap image data to the image forming apparatus 200.

The document management apparatus 400 may include a process target transmission part (not shown) which transmits the document information 430 corresponding to the notice by the process target acquisition part 230 to the image forming apparatus 200.

With the operations described above, the image forming system 100 can complete the image forming process such as the print process, the facsimile process, and the email transmission process between the document management apparatus 400 accumulating an electronic document and the image forming apparatus 200 independent of the PC terminal 500 in which the electronic document is formed, (Process Example Performed by Image Forming System of the Present Embodiment)

Figure 5:
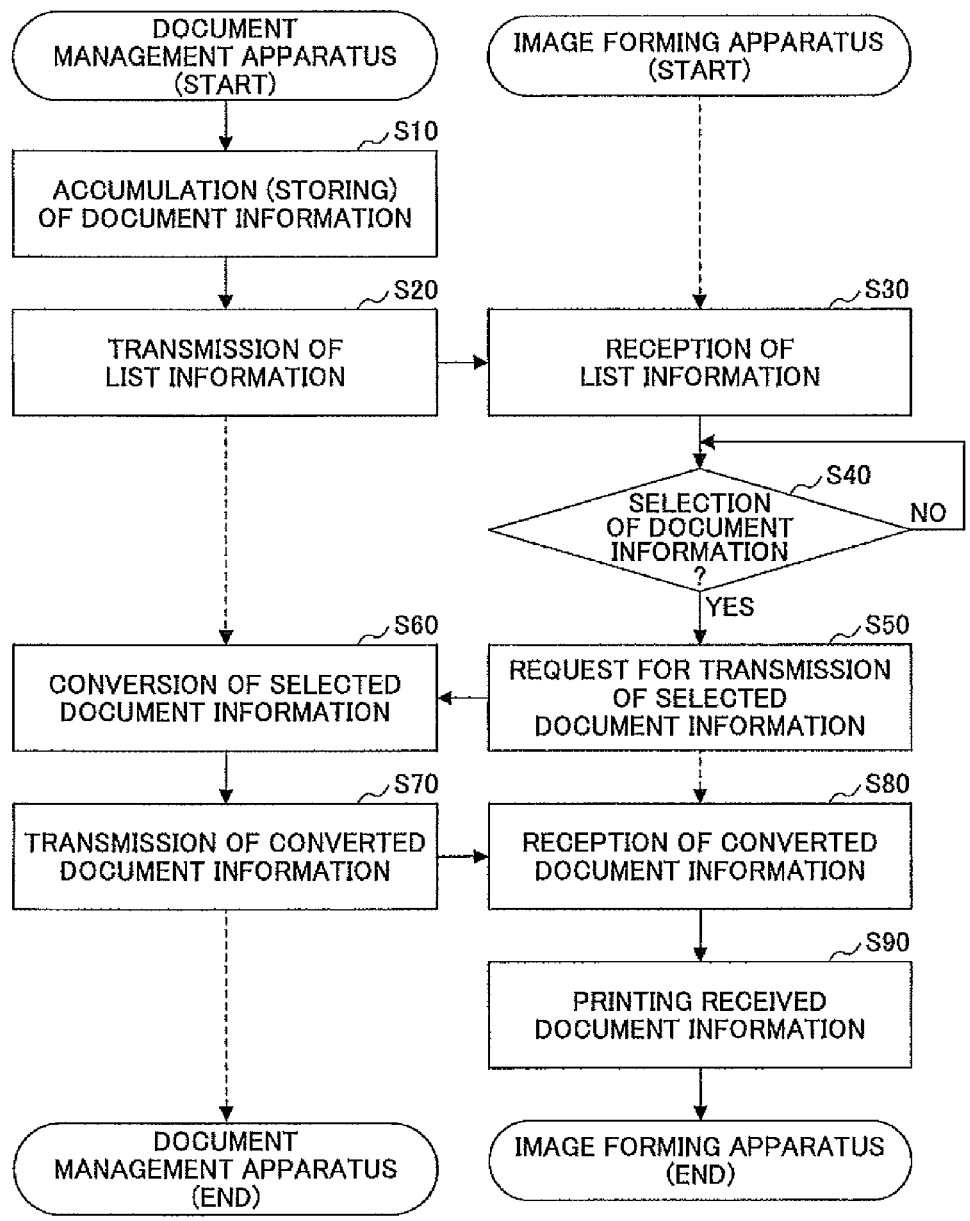
FIG. 5 is a flowchart describing a process flow of the print process by the image forming system (case 1)
Figure 6:
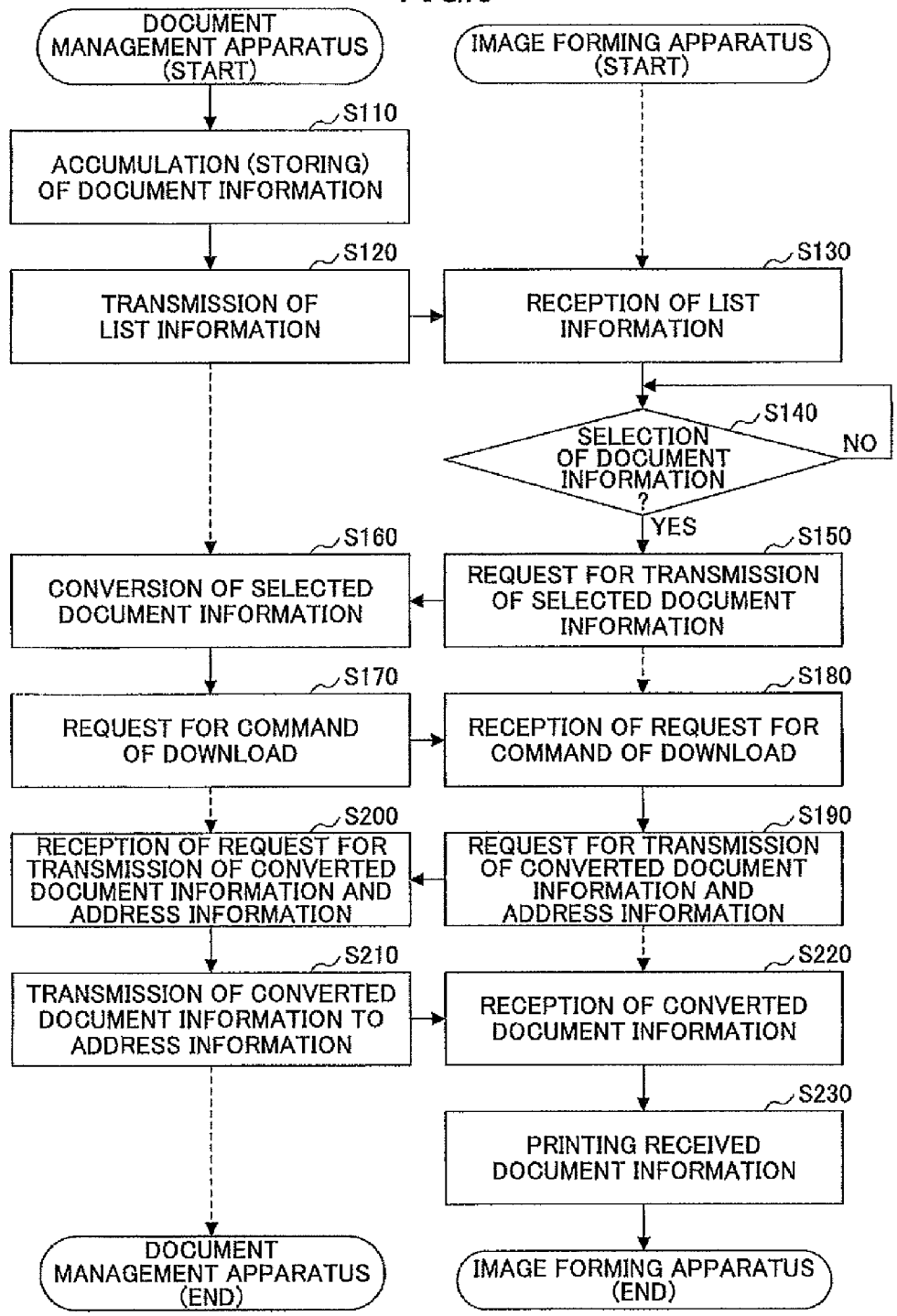
FIG. 6 is a flowchart describing a process flow of the print process by the image forming system (case 2)
Figure 7:
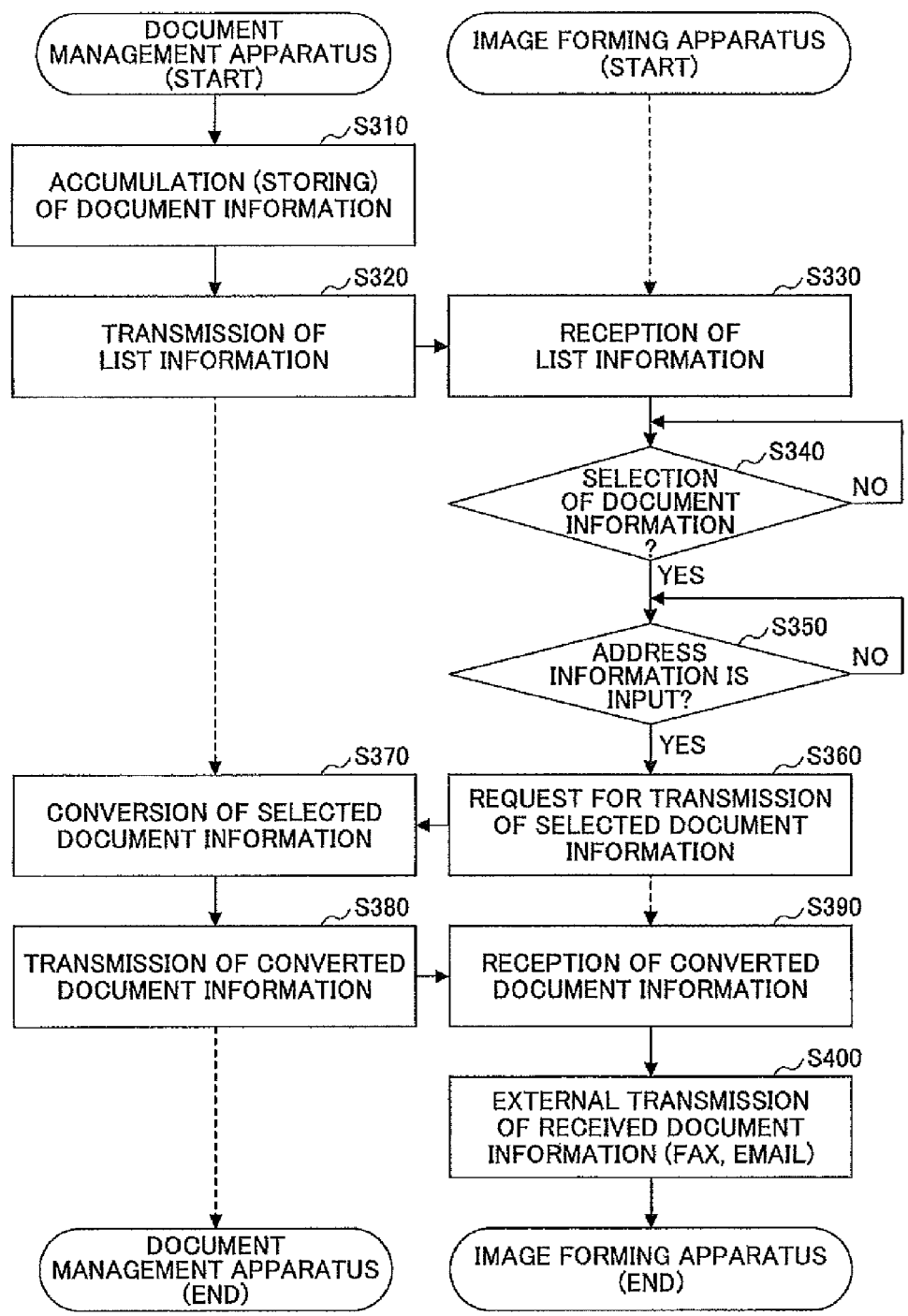
FIG. 7 a flowchart describing a process flow of the print process by the image forming system (case 3).

Using FIGS. 5 through 7, a description will be given for an example of a process performed by the image forming system 100 of the present embodiment.

[1. Example of Process Performed by the Image Forming System 100: Case 1]

Here, by accompanying FIG. 5, a description will be given for an example of a print process performed by the image forming system 100 using FIG. 5. FIG. 5 is a flowchart describing a process flow of the print process by the image forming system 100.

In step S10, the document management apparatus 400 accumulates, for example, the document information 430, an electronic file formed by the PC terminal 500 into the HDD 480. In step S20, the document management apparatus 400 transmits the list information 440 of the document information 430 to be accumulated in the HDD 480 to the image forming apparatus 200.

In step S30, the list acquisition part 220 receives the list information 440 transmitted from the document management apparatus 400, and displays the list information 440 on the display device 300. In step S40, a process target is selected from the list information 440 by the user. When the process target reception part 210 receives a selection of the process target selected by the user (Yes, in step S40), in step S50, the process target acquisition part 230 transmits the selection of the process target corresponding to the document information 430 selected by the user to the document management apparatus 400. On the other hand, when the process target reception part 210 does not receive the selection of the process target selected by the user in step S40 (No, in step S40), the process target reception part 210 is held until the process target is selected by the user in step S40.

In step S60, the PDL conversion part 410 extracts the document information 430 based on the selection of the process target corresponding to the document information 430 selected by the user, and then the PDL conversion part 410 writes the extracted document information 430 in PDL format. In this case, in step S60, it is possible that the bitmap conversion part 420 extracts the document information 430 based on the selection of the process target corresponding to the document information 430 selected by the user, and then the extracted document information 430 is converted into the bitmap image data. Further, step S60 is not an essential requirement, so that the process in step S60 may be skipped and advanced to a process of step S70.

In step S70, the PDL conversion part 410 transmits the document information 430 written in PDL format to the image forming apparatus 200. Further, in step S70, it is possible that the bitmap conversion part 420 transmits the converted bitmap image data to the image forming apparatus 200, or it is possible that the process target acquisition part 230 transmits the document information 430 as originally selected by the user to the image forming apparatus 200.

In step S80, the process target acquisition part 230 receives the document information 430 transmitted from the document management apparatus 400 in step 70, and the image formation part 240 performs the print process for the received data in step S90. In this case, when the image formation part 240 receives PDL format data or the document information 430, bitmap image data are formed based on the PDL format data or the document information 430, and then the formed bitmap image data are output by the plotter 320. Further, when the image formation part 240 receives the bitmap image data, the image formation part 240 outputs the bitmap image data by the plotter 320.

With the operations described above, the image forming system 100 can complete the print process between the document management apparatus 400 accumulating an electronic document and the image forming apparatus 200 independent of the PC terminal 500 in which the electronic document is formed.

Further, since the selection of the process target of the document information selected by the user is received in the MFP connected to the network (referred to as the network MFP), there is no need to perform complicated operations with the PC terminal, so that the print process can be performed from the network MFP side. This makes it possible to achieve simpler operations with the PC terminal, so that the burden of the user may be reduced.

[2. Example of Process Performed by the Image Forming System 100: Case 2]

Here, by accompanying FIG. 6, a description will be given for an example of a print process performed by the image forming system 100, in which it is assumed that a firewall system exists between the image forming apparatus 200 and the document management apparatus 400. FIG. 6 is a flowchart describing a process flow of the print process by the image forming system 100.

In step S110, the document management apparatus 400 accumulates, for example, the document information 430, an electronic file formed by the PC terminal 500 into the HDD 480. In step S120, the document management apparatus 400 transmits the list information 440 of the document information 430 to be accumulated in the HDD 480 to the image forming apparatus 200.

In step S130, the list acquisition part 220 receives the list information 440 transmitted from the document management apparatus 400, and displays the list information 440 on the display device 300. In step S140, a process target is selected from the list information 440 by the user. When the process target reception part 210 receives the selection of the process target selected by the user (Yes, in step S140), in step S150, the process target acquisition part 230 transmits the selection of the process target corresponding to the document information 430 selected by the user to the document management apparatus 400. On the other hand, when the process target reception part 210 does not receive the selection of the process target selected by the user in step S140 (No, in step S140), the process target reception part 210 is held until the process target is selected by the user in step S140.

In step S160, the PDL conversion part 410 extracts the document information 430 based on the selection of the process target corresponding to the document information 430 selected by the user, and then the PDL conversion part 410 writes the extracted document information 430 in PDL format. In this case, in step S160, it is possible that the bitmap conversion part 420 extracts the document information 430 based on the selection of the process target corresponding to the document information 430 selected by the user, and then the extracted document information 430 is converted into the bitmap image data. Further, step S160 is not an essential requirement, so that the process in step S160 may be skipped and the process advanced to step S170.

In step S170, the document management apparatus 400 transmits a request to the image forming apparatus 200 requesting a command to be given from the image forming apparatus 200 to the document management apparatus 400 for downloading the document information 430. The image forming apparatus 200 receives the request from the document management apparatus 400 for downloading the document information 430 in step 180.

In step 190, the command part 235 transmits a transmission request for the document information 430 corresponding to the selection of the process target with destination information (or destination address) such as the IP address of the image forming apparatus 200 as the destination of the document information 430 to the document management apparatus 400. In step 200, the document management apparatus 400 receives the transmission request for the document information 430 with the destination information. In step 210, the PDL conversion part 410 transmits the document information 430 written in PDL format to the destination information received in step S200. Further, in step S210, it is possible that the bitmap conversion part 420 transmits the converted bitmap image data to the destination information received in step S200, or it is possible that the process target transmission part (not shown) transmits the document information 430 as originally selected by the user to the destination information received in step S200.

In step S220, the process target acquisition part 230 receives the document information 430 transmitted from the document management apparatus 400 in step 210, and the image formation part 240 performs the print process for the received data in step S230. In this case, when the image formation part 240 receives PDL format data or the document information 430, the bitmap image data are formed based on the PDL format data or the document information 430, and then the formed bitmap image data are output by the plotter 320. Further, when the image formation part 240 receives the bitmap image data, the image formation part 240 outputs the bitmap image data by the plotter 320.

With the operations described above, since print data are received by downloading the document information in the document management apparatus 400, the reception of the print data can be performed smoothly even if a firewall exists between the document management apparatus 400 and the image forming apparatus 200.

[3. Example of Process Performed by the Image Forming System 100: Case 3]

Here, by accompanying FIG. 7, a description will be given for an example of a facsimile process or an email transmission process performed by the image forming system 100. FIG. 7 is a flowchart describing a process flow of the facsimile process or the email transmission process by the image forming system 100.

In step S310, the document management apparatus 400 accumulates, for example, the document information 430, an electronic file formed by the PC terminal 500 into the HDD 480. In step S320, the document management apparatus 400 transmits the list information 440 of the document information 430 to be accumulated in the HDD 480 to the image forming apparatus 200.

In step S330, the list acquisition part 220 receives the list information 440 transmitted from the document management apparatus 400, and displays the list information 440 on the display device 300. In step S340, a process target is selected from the list information 440 by the user. When the process target reception part 210 receives the selection of the process target selected by the user (Yes, in step S340), the process is advanced to step S350. On the other hand, when the process target reception part 210 does not receive the selection of the process target selected by the user in step S340 (No, in step S340), the process target reception part 210 is held until the process target is selected by the user in step S340.

In step S350, when the process target reception part 210 receives a user input with respect to destination information of the facsimile process or the email transmission process (Yes, in step S350), in step S360, the process target acquisition part 230 transmits the selection of the process target of the document information 430 selected by the user to the document management apparatus 400. On the other hand, when the process target reception part 210 does not receive the user input with respect to the destination information in step S350 (No, in step S350), the process target reception part 210 is held until the process target is selected by the user in step S350.

In step S370, the PDL conversion part 410 extracts the document information 430 based on the selection of the process target corresponding to the document information 430 selected by the user, and then the PDL conversion part 410 writes the extracted document information 430 in PDL format. In this case, in step S370, it is possible that the bitmap conversion part 420 extracts the document information 430 based on the selection of the process target corresponding to the document information 430 selected by the user, and then the bitmap conversion part 420 converts the extracted document information 430 into the bitmap image data. Further, step S370 is not an essential requirement, so that the process in step S370 may be skipped and the process advanced to step S380.

In step S380, the PDL conversion part 410 transmits the document information 430 written in PDL format to the image forming apparatus 200. Further, in step S380, it is possible that the bitmap conversion part 420 transmits the converted bitmap image data to the image forming apparatus 200, or it is possible that the document information 430 may be transmitted in a form as originally selected by the user to the image forming apparatus 200.

In step S390, the process target acquisition part 230 receives the document information 430 transmitted from the document management apparatus 400 in step 380, and the image formation part 240 performs the facsimile transmission to the destination information received in step 350 or transmits the email with an attachment of the document information 430 to the destination information received in step 350.

With the operations described above, the image forming system 100 can complete the print process between the document management apparatus 400 accumulating an electronic document and the image forming apparatus 200 independent of the PC terminal 500 in which the electronic document is formed.

The present invention provides a novel and useful network MFP having improved customization and convenience by taking into account a user's preference, office environment or the like. Further, it becomes possible to use the print function, the facsimile function or the like of the network MFP without requiring complicated settings of the PC terminal.

The present invention is not limited to the specifically disclosed embodiments, and variations and modifications may be made without departing from the scope of the present invention.

The present application is based on Japanese priority application No. 2008-068626 filed Mar. 18, 2008, and Japanese priority application No. 2008-302902 filed Nov. 27, 2008, the entire contents of which are hereby incorporated herein by reference.

What is claimed is:

1. An image forming system comprising:
    an image forming apparatus including a display device and configured to function as a Web client; and
    a document management apparatus managing document information created by a personal computer terminal usable for a process target of the image forming apparatus and list information of the document information and configured to function as a Web server, the document management apparatus being coupled to the image forming apparatus via a communication network;

said image forming apparatus comprising:

a list acquisition part configured to acquire the list information from the document management apparatus independent of the personal computer terminal;

a process target reception part configured to display the list information acquired by the list acquisition part on the display device provided in the image forming apparatus, and to receive a selection of the process target which is selected from the list information displayed on the display device provided in the image forming apparatus so as to perform an image forming processing by the image forming apparatus, said selection including identifying information that identifies document information as the process target and address information of the image forming apparatus that performs the image forming processing, said receiving the selection of the process target is performed independent of the personal computer terminal;

a process target acquisition part configured to acquire the document information corresponding to the selection of the process target received by the process target reception part from the document management apparatus, said acquiring the document information is performed independent of the personal computer terminal; and an image formation part configured to perform a predetermined image forming process for the document information acquired by the process target acquisition part, wherein the process target acquisition part is further configured to transmit, to the document management apparatus, a request for the document information corresponding to the selection of the process target and the address information so as to download the document information corresponding to the selection of the process target according to the identifying information that identifies the document information as the process target and the address information that are included in the selection and transmitted to the document management apparatus.

2. The image forming system as claimed in claim 1, wherein said document management apparatus further comprises:

a conversion part configured to write the document information corresponding to the selection of the process target received by the process target reception part in a page description language format, wherein the process target acquisition part acquires the document information written in the page description language format by the conversion part corresponding to the selection of the process target.

3. The image forming system as claimed in claim 1, wherein said document management apparatus comprises:

a bitmap conversion part configured to convert the document information corresponding to the selection of the process target received by the process target reception part into bitmap image data, wherein the process target acquisition part acquires the bitmap image data converted by the bitmap conversion part.

4. The image forming system as claimed in claim 1, wherein the process target reception part further receives destination information of the process target when the predetermined image forming process is a facsimile process or an email process.

5. The image forming system as claimed in claim 1, wherein said image forming apparatus further comprises:

a command part configured to transmit a transmission request for the document information corresponding to the selection of the process target received by the process target reception part with destination information of the image forming apparatus to the document management apparatus.

6. A system control method of an image forming system, wherein the image system includes:

an image forming apparatus including a display device and configured to function as a Web client; and a document management apparatus managing document information created by a personal computer terminal usable for a process target of the image forming apparatus and list information of the document information and configured to function as a Web server, the image forming apparatus and the document management apparatus being coupled via a communication network;

the system control method comprising the steps of:

acquiring, by the image forming apparatus, the list information from the document management apparatus independent of the personal computer terminal;

displaying, by the image forming apparatus, the list information acquired by said acquiring and receiving a selection of the process target selected from the list information displayed on the display device provided in the image forming apparatus so as to perform an image forming processing by the image forming apparatus, said selection including identifying information that identifies document information as the process target and address information of the image forming apparatus that performs the image forming processing, said receiving the selection of the process target is performed independent of the personal computer terminal;

acquiring, by the image forming apparatus, the document information corresponding to said selection of the process target from the document management apparatus, said acquiring the document information is performed independent of the personal computer terminal; and performing, by the image forming apparatus, a predetermined image forming process for the document information acquired by said acquiring the document information corresponding to the selection of the process target, wherein the system control method further comprises transmitting, to the document management apparatus, a request for the document information corresponding to the selection of the process target and the address information so as to download the document information corresponding to the selection of the process target according to the identifying information that identifies the document information as the process target and the address information that are included in the selection and transmitted to the document management apparatus.

7. The system control method as claimed in claim 6, further comprising the steps of:

writing the document information corresponding to the selection of the process target received in the step of acquiring the list information in a page description language format by the document management apparatus; and acquiring the document information written in the page description language format corresponding to the selection of the process target by the image forming apparatus.

8. The system control method as claimed in claim 6, further comprising the step of:

converting, by the document management apparatus, the document information corresponding to the selection of the process target received in the step of acquiring the list information into bitmap image data; and acquiring, by the image forming apparatus, the bitmap image data converted in the step of converting the document information corresponding to the selection of the process target.

9. The system control method as claimed in claim 6, wherein destination information of the process target is received in the step of receiving the selection of the process target selected from the list information when the predetermined image forming process is a facsimile process or an email process.

10. The system control method as claimed in claim 6, further comprising the steps of:

transmitting, by the image forming apparatus, a transmission request for the document information corresponding to the selection of the process target received in the step of acquiring the list information and the destination information of the image forming apparatus to the document management apparatus.

11. An image forming apparatus including a display device and configured to function as a Web client, the image forming apparatus comprising:

a document management apparatus managing document information created by a personal computer terminal usable for a process target of the image forming apparatus and list information of the document information and configured to function as a Web server, the document management apparatus being coupled to the image forming apparatus via a communication network;

a list acquisition part configured to acquire the list information from the document management apparatus independent of the personal computer terminal;

a process target reception part configured to display the list information acquired by the list acquisition part on the display device provided in the image forming apparatus, and to receive a selection of the process target which is selected from the list information displayed on the display device provided in the image forming apparatus so as to perform an image forming processing by the image forming apparatus, said selection including identifying information that identifies document information as the process target and address information of the image forming apparatus that performs the image forming processing, said receiving the selection of the process target is performed independent of the personal computer terminal;

a process target acquisition part configured to acquire the document information corresponding to the selection of the process target received by the process target reception part from the document management apparatus, said acquiring the document information is performed independent of the personal computer terminal; and an image formation part configured to perform a predetermined image forming process for the document information acquired by the process target acquisition part, wherein the process target acquisition part is further configured to transmit, to the document management apparatus, a request for the document information corresponding to the selection of the process target and the address information so as to download the document information corresponding to the selection of the process target according to the identifying information that identifies the document information as the process target and the address information that are included in the selection and transmitted to the document management apparatus.

12. The image forming apparatus as claimed in claim 11, wherein:

the document management apparatus includes a conversion part configured to write the document information corresponding to the selection of the process target received by the process target reception part in a page description language format; and the process target acquisition part acquires the document information written in the page description language format by the conversion part corresponding to the selection of the process target.

13. The image forming apparatus as claimed in claim 11, wherein:

the document management apparatus includes a bitmap conversion part configured to convert the document information corresponding to the selection of the process target received by the process target reception part into bitmap image data; and the process target acquisition part acquires the document information converted into the bitmap image data by the bitmap conversion part corresponding to the selection of the process target.

14. The image forming apparatus as claimed in claim 11, wherein the process target reception part further receives destination information of the process target when the predetermined image forming process is a facsimile process or an email process.

15. The image forming apparatus as claimed in claim 11, further comprising:

a command part configured to transmit a transmission request for the document information corresponding to the selection of the process target received by the process target reception part with destination information of the image forming apparatus to the document management apparatus.

16. A non-transitory computer-readable recording medium on which a program which, when executed by a computer, causes the computer to perform the system control method of claim 6.

17. The non-transitory computer-readable recording medium as claimed in claim 16, wherein the system control method further comprises the steps of:

writing the document information corresponding to the selection of the process target received in the step of acquiring the list information in a page description language format by a conversion part; and acquiring the document information written in the page description language format corresponding to the selection of the process target.

18. The non-transitory computer-readable recording medium as claimed in claim 16, wherein the system control method further comprises the steps of:

converting the document information corresponding to the selection of the process target received in the step of acquiring the list information into bitmap image data; and acquiring the bitmap image data converted in the step of converting the document information corresponding to the selection of the process target.

19. The non-transitory computer-readable recording medium as claimed in claim 16, wherein destination information of the process target is received in the step of receiving the selection of the process target selected from the list information when the predetermined image forming process is a facsimile process or an email process.

20. The non-transitory computer-readable recording medium as claimed in claim 16, wherein the system control method further comprises the steps of:
   transmitting a transmission request for the document information corresponding to the selection of the process target received in the step of acquiring the list information and the destination information of the image forming apparatus to the document management apparatus.

* * * * *